Nov. 12, 1946.　　　　　T. C. DEMERS　　　　　2,411,084
PAGE TURNING DEVICE FOR INVALIDS
Filed June 14, 1945　　　　7 Sheets-Sheet 4

INVENTOR.
T. C. Demers
BY
Kimmel & Crowell Attys.

Nov. 12, 1946.  T. C. DEMERS  2,411,084
PAGE TURNING DEVICE FOR INVALIDS
Filed June 14, 1945    7 Sheets-Sheet 7

INVENTOR.
T. C. Demers
BY Kimmel & Crowell Attys.

Patented Nov. 12, 1946

2,411,084

UNITED STATES PATENT OFFICE 2,411,084

PAGE TURNING DEVICE FOR INVALIDS

Telesphore C. Demers, Lebanon, N. H.

Application June 14, 1945, Serial No. 599,401

10 Claims. (Cl. 40—104)

1

This invention relates to a device for turning the pages of folios, books or the like, and newspapers.

An object of this invention is to provide a device whereby a bedridden person incapable of holding folios, books or the like may read and turn the pages with a minimum of effort.

Another object of this invention is to provide a device of this kind which includes a supporting rack for the reading matter and electrically operated means actuated through an air operated switch set in operation by the reader, and which is automatically cut off at the end of each page turning cycle.

A further object of this invention is to provide in a device of this kind an improved means for progressively turning the pages and releasing each page after it has been turned.

A further object of this invention is to provide a page turning mechanism wherein selected pages or portions of a book may be turned and maintained in a reading position.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 4 is a front elevation partly broken away and in section of the device.

2

Figure 1:
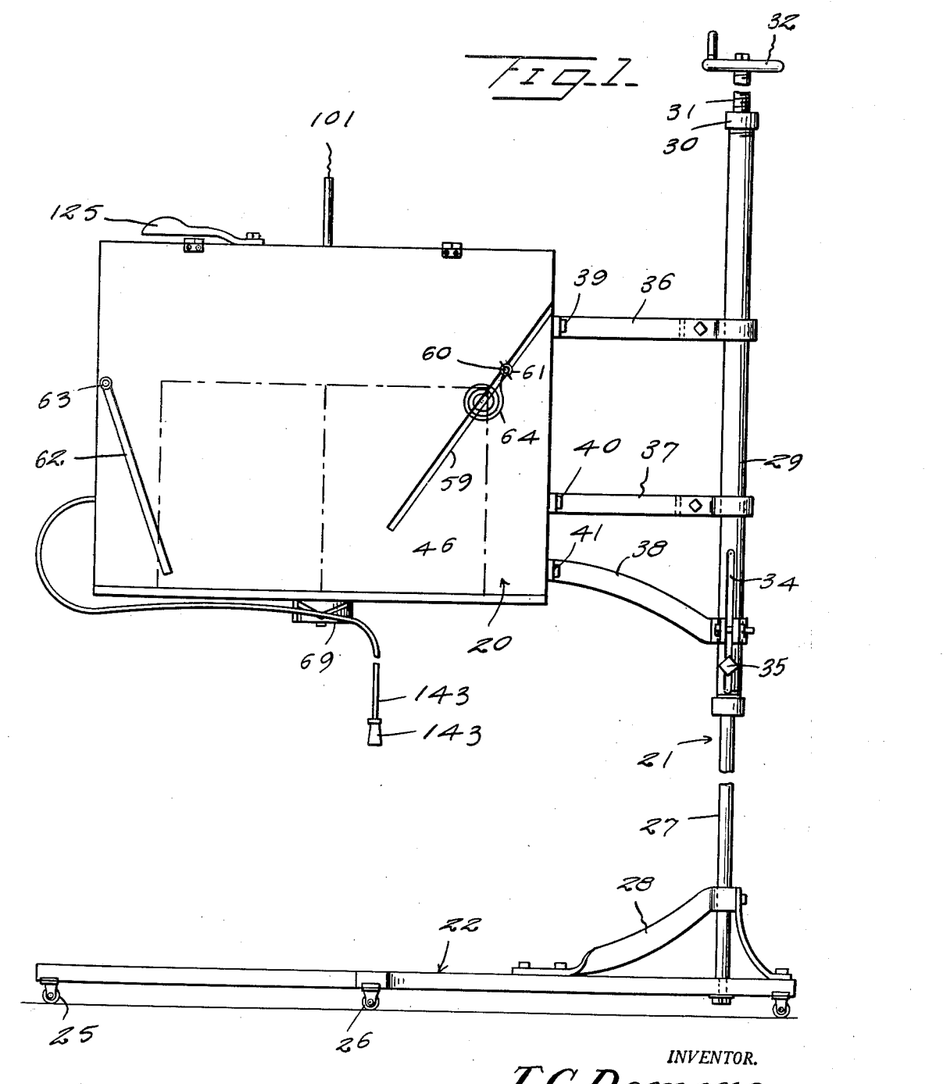
Figure 1 is a detail front elevation partly broken away of a page turning mechanism constructed according to an embodiment of this invention, a portion of the mechanism being omitted from the upper portion of the device.
Figures 2, 3:
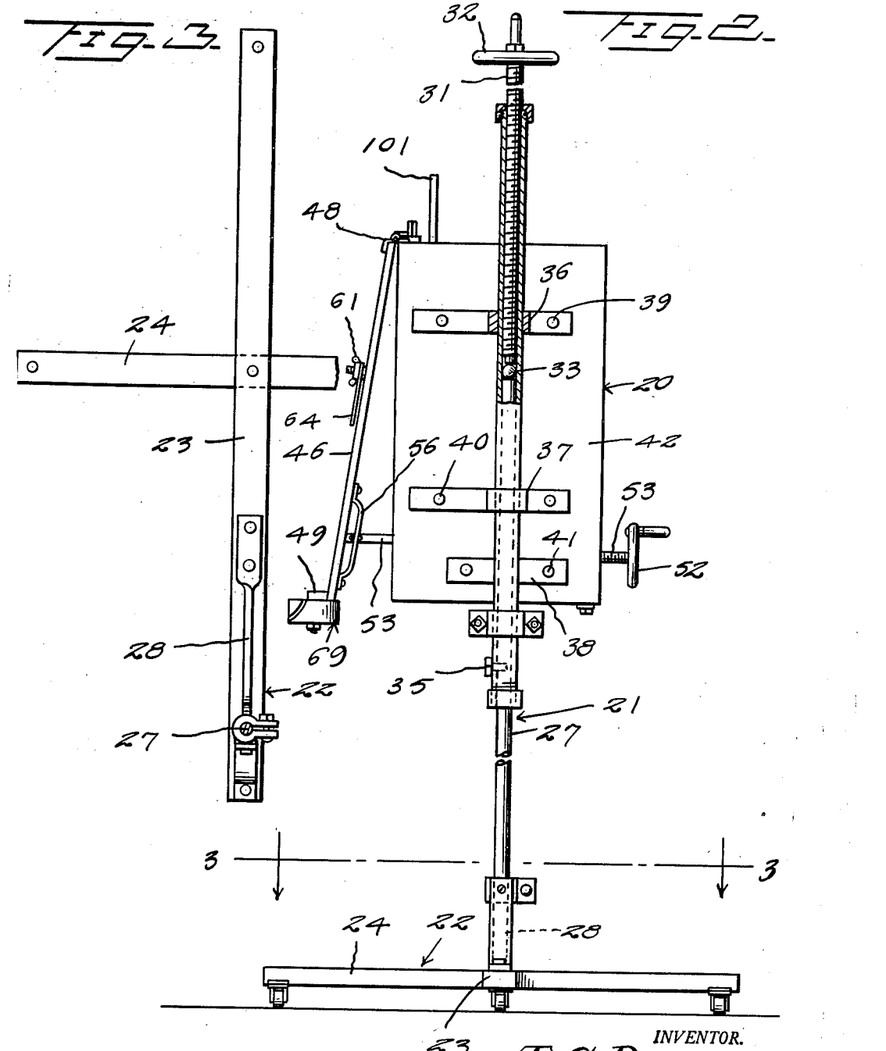
Figure 2 is a detail side elevation of the device.
Figure 3 is a sectional view taken on the line 3—3 of Figure 2.

Referring to the drawings, the numeral 20 designates generally a housing which is adapted to be positioned over the bed of a patient. The housing 20 is supported over the bed by means of a supporting structure, generally designated as 21. The supporting structure 21 includes a base 22 which is formed, as shown in Figure 3, of an elongated bar 23 having secured between the ends thereof a right angularly disposed bar 24. Casters 25 are secured to the opposite ends of the longitudinal bar 23 and casters 26 are secured to the opposite ends of the transverse bar 24. An upright standard including a lower post 27 which is secured to the base 22 by bracing members 28 extends from the base 22 adjacent one end thereof and a tubular standard member 29 is adapted to telescope over the lower member 27. The upper or tubular standard member 29 has threaded through an upper nut 30 carried thereby a threaded shaft or elevating member 31. The shaft 31 has a hand wheel 32 secured to the upper end thereof and the inner end of the shaft 31 is adapted to engage the upper end of the lower standard member 27.

Preferably a ball 33 is interposed between the lower end of the shaft 31 and the upper end of the lower standard member 27. The upper standard member 29 is provided adjacent the lower end thereof with an elongated slot 34 through which a cap screw 35 engages, the screw 35 being threaded into the lower standard member 27 so as to thereby hold the upper standard 29 against rotation or turning with respect to the lower standard member 27.

The housing 20 is supported laterally from the standard 21 by means of a plurality of bracket arms 36, 37 and 38. The bracket arms are connected at their outer ends to the upper standard member 29 and are secured at their inner ends by fastening members 39, 40 and 41 respectively to the adjacent side wall 42 of the housing 20.

The housing 20 includes opposite side walls 42 and 43, a bottom wall 44, a rear wall 45 and a front wall 46. A top wall 47 engages over the upper end of the housing and the front wall 46 is hingedly secured as at 48 to the forward end of the top wall 47. The front wall 46 comprises a book or article holder and has secured to the lower end thereof a forwardly projecting member 49 forming a ledge or book support. The book supporting wall or front wall 46 is angularly adjusted by means of a screw shaft 50. The screw shaft 50 is threaded through a nut 51 carried by the housing 20 adjacent the rear wall 45 and has a hand wheel 52 secured to the rear projecting end thereof.

Figures 6, 17:
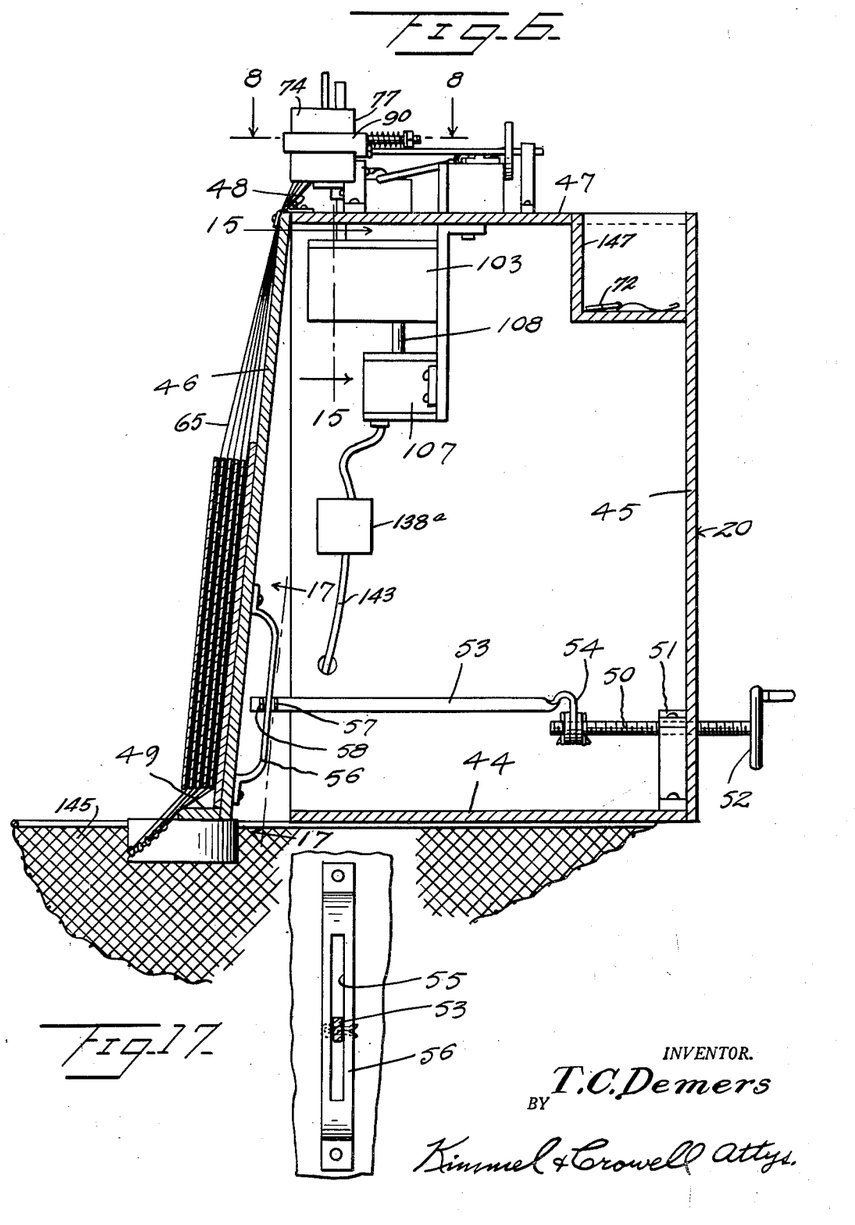
Figure 6 is a sectional view taken on the line 6—6 of Figure 5.
Figure 17 is a sectional view taken on the line 17—17 of Figure 6.
Figures 7, 8, 9, 15, 16:
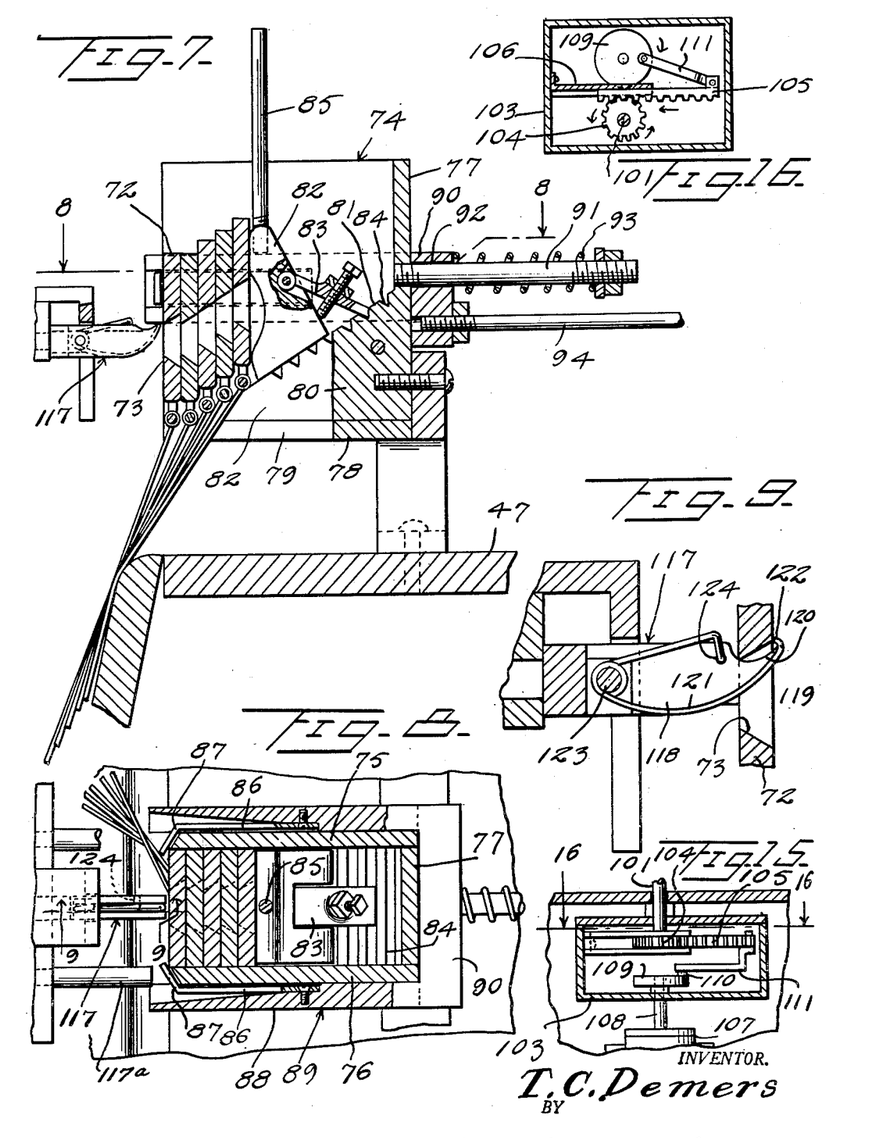
Figure 7 is a sectional view taken on the line 7—7 of Figure 5.
Figure 8 is a sectional view taken on the line 8—8 of either Figures 6 or 7.
Figure 9 is a sectional view taken on the line 9—9 of Figure 8.
Figure 15 is a sectional view taken on the line 15—15 of Figure 6.
Figure 16 is a sectional view taken on the line 16—16 of Figure 15.
Figures 10, 11, 12, 13, 14:
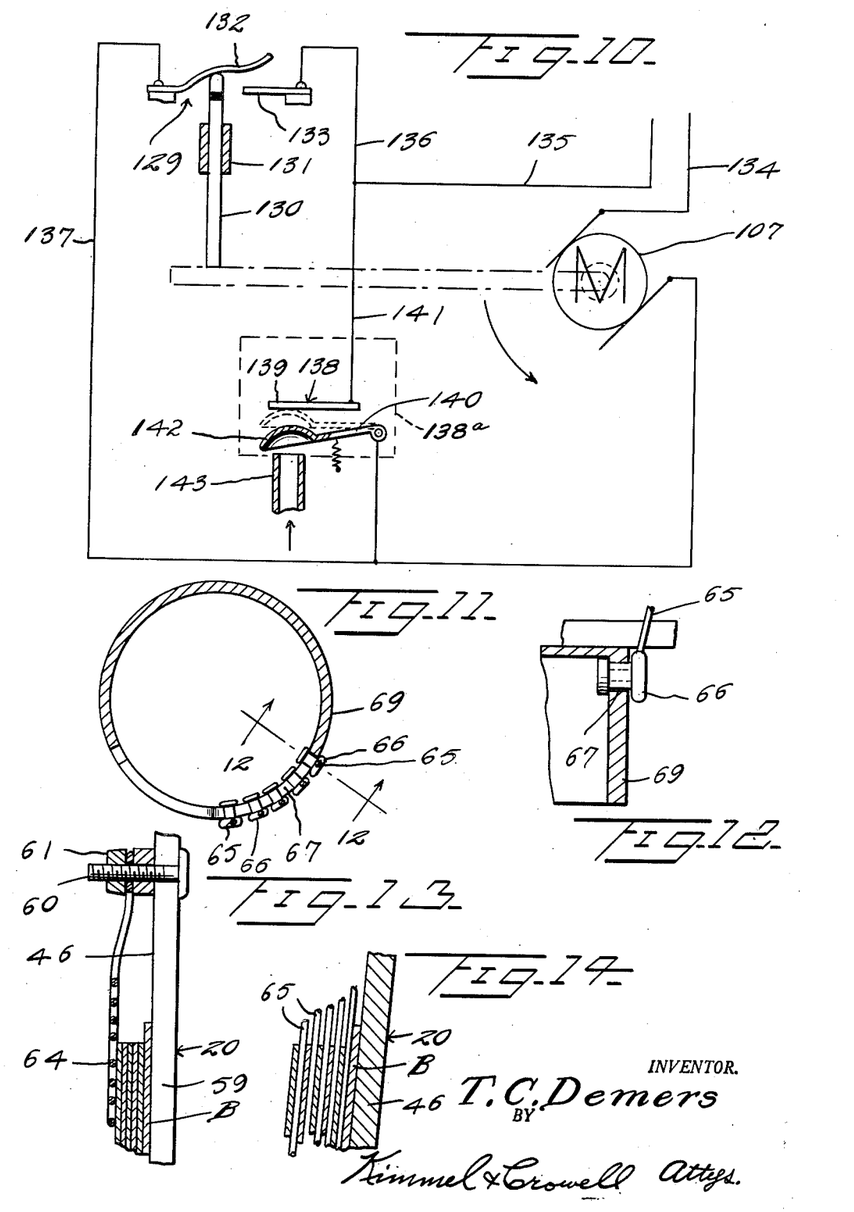
Figure 10 is a diagrammatic view of the electric circuits embodied in this invention.
Figure 11 is a sectional view taken on the line 11—11 of Figure 4.
Figure 12 is a sectional view taken on the line 12—12 of Figure 11.
Figure 13 is a sectional view taken on the line 13—13 of Figure 4.
Figure 14 is a sectional view taken on the line 14—14 of Figure 4.

The forward or inner end of the shaft 50 has swively mounted thereon the rear end of a link 53. The link 53 extends substantially horizontally forward from the shaft 50 and is provided with a right angularly disposed rear end 54 through which the shaft 50 loosely engages. The forward end of the link 53, as shown in Figure 17, engages in a slot 55 formed in a bowed bar 56 which is secured to the inner side of the holder or front wall 46. The link 53 has extending transversely therethrough a pair of cotter pins 57 and 58, which engage on opposite sides of the bar 56 so that endwise movement of the link 53 will effect angular adjustment of the holder 46.

A book B is adapted to engage the ledge 49 and is opened so that the cover thereof will rest against the front side of the holder 46. An elongated bar 59 is mounted on a bolt 60 extending through the holder 46 and has a thumb nut 61 threaded thereon. The bar 59 is adapted to engage the rear cover of the book so as to firmly hold this cover against the holder 46. A second bar 62 pivotally mounted on a pivot 63, carried by the holder 47, adjacent the opposite side thereof, is adapted to engage the front cover of the book so that the book will be held in open position. In order to provide a releasable means for holding the leaves of the book, I have provided a coil spring 64. The coil spring 64 may be secured to the nut 61 and is adapted to engage the upper right hand corner of the uppermost leaf of the book. The bar 62 is preferably of a resilient characteristic so that when a number of leaves have been turned these leaves may be engaged beneath the bar 62. In this manner the bar 62 will hold the turned leaves and also the front cover of the book flat against the holder 46.

In order to provide for the successive turning of the leaves of the book, I have provided a plurality of elongated flexible members 65. The flexible members 65 are of light construction and each flexible member 65 is adapted to be inserted between a pair of book leaves on an angle to the vertical, as shown in Figure 4. The lower end of each leaf turning member 65 has mounted thereof an enlargement or roller 66 which engages in a V-shaped track or slot 67 formed in a cylindrical member 69. The cylindrical member 69 is secured by a fastening means 70 to the lower side of the ledge 49 and the slot or track 67 has an entrance or release slot 71 communicating with one end thereof so that the rollers or slide members 66 may be inserted in the track or removed therefrom. The upper end of each page turning member 65 has secured thereto a plate 72 which is formed with a tapered opening 73.

A magazine or holder generally designated as 74 is mounted on the top wall 47 of the housing adjacent one side thereof and is adapted to receive a plurality of the plates or clips 72. The magazine 74 includes a pair of opposite side walls 75 and 76, a rear end wall 77 and a bottom wall 78 which is formed with a centrally disposed slot 79. An inner bottom or block 80 is mounted within the magazine 74 and is provided with a downwardly and forwardly inclined upper surface 81. The block 80 is also formed with a slot 82 through which the flexible members 65 are adapted to loosely engage. The inclined surface 81 provides a means whereby the clips 72 may slidingly engage within the magazine and will gravitatingly move downwardly and forwardly as the foremost clip is withdrawn by the mechanism to be hereinafter described.

A follower 82 slidingly engages the inclined surface 81 and has pivotally secured thereto a lever 83 which extends rearwardly and downwardly and is adapted to progressively engage in notches 84 formed in the inclined surface 81. The lever 83 constitutes a stop or holding means to prevent rearward and upward movement of the follower 82 and the clips 72 engaging against the forward side thereof as the foremost clip is released. An upwardly extending rod or handle 85 is carried by the follower 82 and projects above the open top of the magazine. In order to provide for the progressive release of the clips 72, I have provided a pair of elongated flat springs 86, which are formed at their forward ends with confronting bills 87 engageable with the foremost of the clips 72. The springs 86 are secured to the opposite parallel legs 88 of a U-shaped clip releasing member 89 which slidingly engages the opposite sides of the magazine 74. The U-shaped member 89 includes a bight or connecting bar 90 connecting the rear ends of the legs 88 together and engaging across the rear wall 77 of the magazine. A bar or rod 91 is secured to the rear wall 77 of the magazine and loosely engages through an opening 92 formed in the bight 90.

A spring 93 engages about the bar or rod 91 and constantly urges the U-shaped member 89 to its foremost clip holding position. The clip releasing member 89 is adapted to be moved rearwardly to a released position by means of an elongated rod 94 which is secured at one end to the bight 90 of the clip releasing member and the rod 94 is slidable in a guide 95 carried by the top wall 47 of the housing. The rod 94 has secured thereto a plate 96 which is engaged by an elongated rod 97. The rod 97 is slidable in a pair of guides 98 fixed to the top wall 47 and is constantly urged to a released position with respect to the plate 96 by means of a spring 99 which engages at one end against the rearmost of the guides 98 and at the opposite end against a washer 100, which is fixed relative to the rod 97. A vertically disposed shaft 101 extends above the top wall 47 and has secured thereto a cam member 102 which is engageable with the forward end of the rod 97 and is adapted to move the rod 97 rearwardly and thereby effect rearward movement of the clip releasing member 89. The shaft 101 extends downwardly through the top wall 47 and into a gear housing 103. The lower end of the shaft 101 has fixed thereto a spur gear 104 which meshes with an elongated gear rack 105 slidingly carried by a guide 106 fixed horizontally within the housing 103. A motor 107 which may include a speed reducing means (not shown) is disposed below the housing 103 and has a shaft 108 extending upwardly into the housing 103 on which is mounted a plate 109 having an eccentrically disposed pin 110. A pitman 111 is connected at one end to the pin 110 and at the opposite end to one end of the gear rack 105. In this manner rotation of the shaft 108 will effect reciprocation of the rack 105 and effect partial rotation back and forth of the shaft 101.

In order to provide a means whereby the clips 72 may be progressively removed from the magazine 74, I have provided an elongated swinging arm generally designated as 112. The arm 112 includes an inner arm member 113 and an outer arm member 114, which is hingedly secured by hinge means 115 to the inner arm member 113 and one or more springs 116 are connected to the arm members or sections 113 and 114 on the sides thereof opposite from the hinge 115, so as to yieldingly maintain the arm sections in alignment while at the same time providing a cushioning means for cushioning the arm sections when the swinging arm is turned to a clip lifting position. The outer arm section 114 has mounted thereon a right-angularly extending clip lifting member which includes a substantially U-shaped member 117 having the forward or outer ends of the opposite legs 118 thereof formed with an upturned bill 119. The bill 119 is adapted to engage within the opening 73 of a clip 72 and the upper edge of each parallel leg 118 is formed with a concave seat 120 within which the clip 72 is adapted to engage. In order to provide for lifting of the foremost clip when the U-shaped member 117 initially engages a clip, I have provided an upwardly bent spring 121, which is formed with a reverted forward end 122 engaging over the points of the bills 119. The spring 121 is mounted on a pin 123 extending between the parallel legs 118 and is anchored, as at 124, to at least one of the legs 118. The reverted end 122 of the spring 121 constitutes not only a lifting means for lifting the foremost clip during the movement of the clip supporting member toward the magazine 72, but also provides a means for locking the clip engaged thereby on the seat 120. A pair of parallel spaced apart lugs 117a, one on each side of the member 117, are fixed to the arm 114 to provide guides for the clips 72 on the seat 120. After the foremost clip 72 is engaged with the supporting member 117, arm 112 is swung to the left as viewed in Figure 4 and as the flexible member 65 carried by the foremost clip 72 is engaged between a pair of book leaves, the outer leaf will be turned with the swinging of the arm 112. When the arm 112 swings to the left in substantially a semi-circle, the clip engaged with the arm 112 is released therefrom by means of a cam shaped clip releasing member 125, which is carried by a supporting arm 126 fixed by fastening means 127 to the top wall 47.

The releasing cam 125 is formed with a convex upper surface and after the clip has been released from the locking lip 122 of the spring 121 the clip is adapted to fall rearwardly over the releasing member 125 and may slide downwardly over the convex surface thereof onto the supporting arm 126 and depend within a receptacle 128 which is carried by the top wall 47. The motor 107 is stopped when the arm 112 has completed its page turning cycle by means of a switch 129, which is secured to the top wall 47 and includes a slidable circuit breaking rod 130 carried by a guide 131. The rod 130 is engaged by the rear side of the arm 112 which moves rod 130 rearwardly and this rod at its rear end engages a resilient contact member 132, which is normally in engagement with a stationary contact member 133. The motor 107 has connected to one side thereof a conductor 134 which is connected to one side of a supply source and a conductor 135 extends from the other side of the supply source.

A conductor 136 is connected at one end to the conductor 135 and at the other end to contact 133. A conductor 137 is connected at one end to resilient contact 132 and at the other end to the opposite side of the motor 107. In order to provide a means whereby the user of this device may return page turning arm 112 to the clip magazine when the switch 129 is in circuit breaking position, I have provided a shunt switch generally designated as 138, in a housing 138a fixed in the housing 20. The shunt switch 138 includes a stationary contact 139 and a spring pressed movable contact 140 which is spring pressed to a circuit breaking position. Switch 138 is interposed in a conductor 141 connected between conductor 135 and conductor 137. Spring pressed contact member 140 includes a cup-shaped forward end 142 which is disposed in confronting position to the rear end of a flexible tube 143. The tube 143 may be provided with a mouth piece 144 so that the user of this device may blow through the tube 143 and thereby move contact member 140 to circuit closing position and thereby effect initial operation of the motor 107.

After the motor 107 is initially operating, arm 112 will be swung in a counter-clockwise direction releasing rod 130 and permitting spring contact 132 to assume its normal circuit position with respect to the contact 133. Arm 112 will then swing in a counter-clockwise direction to a position confronting the clip magazine 74 and will then swing in a clockwise direction, turning the page of a book which is engaged by the flexible member 65 and when arm 112 reaches the end of its page turning cycle, this arm will again engage rod 130 and move switch member 132 to a circuit breaking position. A net 145 carried by a rim 146 which is fixed to the bottom of the housing 20, is disposed therebelow so as to catch any clips which might drop down or become disengaged without being caught on the clip supporting member 117. The top wall 47 is further formed with a receptacle 147 for holding extra clips 72 which are not being used on the device.

In the use and operation of this device the housing 20 is supported over the bed, being adjusted by means of the screw shaft 31. The book B is placed on the inclined front wall 46 of the housing and this wall is adjusted angularly by means of the adjusting shaft 50. The flexible members 65 are inserted between the pages of the book which are to be turned and at this time the roller 66 at the lower ends of the flexible member 65 will be disposed in the right side of the V-shaped channel or track 67. The clips 72 are inserted progressively in the magazine 74, the follower 82 being moved upwardly and rearwardly on the inclined surface 81 so as to permit the insertion of the clips in the magazine. When the reader desires to turn a page he blows through the mouth piece 144 thereby causing shunt switch 138 to close and effecting initial operation of motor 107. Arm 112 which will initially be in its left position engaging switch opening member 130 will swing counterclockwise or to the right and after arm 112 has released circuit breaking member 130, switch member 132 will engage contact 133 and motor 107 will thereupon continue to operate arm 112 completing its return cycle and lifting the foremost of the clips 72.

Figure 5:
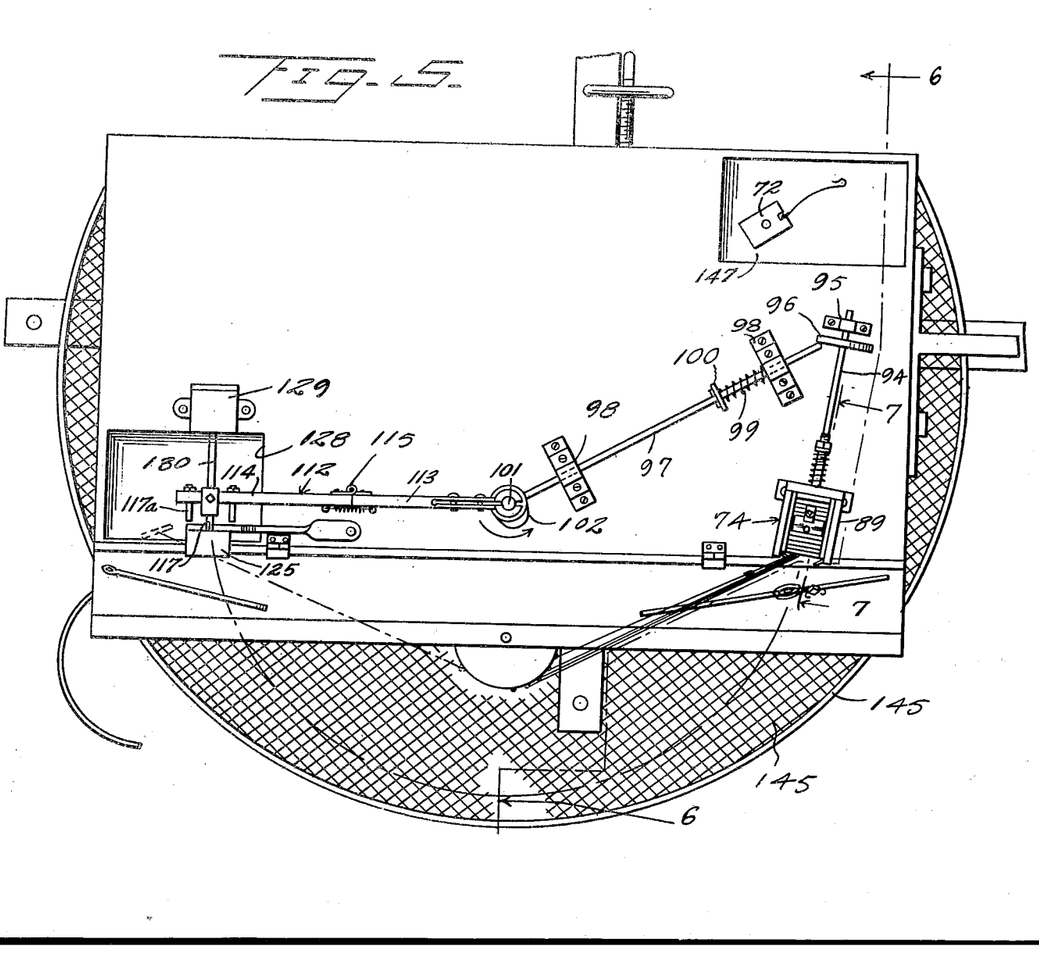
Figure 5 is a plan view partly broken away of the device.

At the time arm 112 is in its clip engaging position, cam 102 will move releasing rod 97 rearwardly so that clip holding springs 86 will be in their released position. The foremost clip may thereupon be removed as arm 112 begins its page turning cycle by swinging clockwise or to the left as viewed in Figure 5. When arm 112 is at substantially the end of its page turning cycle, clip releasing member 125 will remove the clip carried by the supporting member 117 and cause the clip to drop over the front wall 46 and into the receptacle 128. The clip will hang downwardly in this receptacle and will hold the turned page in its proper position. As flexible member 65 swings on its page turning movement the roller 66 at the lower end of the flexible member 65 will move downwardly in the track 67 and will then move upwardly on the left side of this V-shaped track. The flexible members 65 may be made from a cord or may be made partly of cord and partly of wire as indicated by the numeral 65ª.

What I claim is:

1. A page turning device comprising a book supporting rack, a plurality of flexible page turning members, means holding the lower ends of said members substantially centrally of the book and below the lower edge thereof, an oscillatable arm carried by said rack, means for oscillating said arm, an apertured member carried by the upper end of each flexible member, means supporting said apertured members in side by side relation, and means carried by said arm for gripping the foremost of said apertured members whereby the flexible member attached thereto will be swung to the opposite side of the rack and a page engaged thereby will be turned.

2. A page turning device as set forth in claim 1 including means carried by said rack for removing the apertured member from said arm when the latter has completed a page turning cycle.

3. A page turning device as set forth in claim 1 including means for rendering said operating means inactive when said arm has completed a page turning cycle.

4. A page turning device as set forth in claim 1 including means releasing the foremost of said apertured members when said arm is disposed in receiving position.

5. A page turning device as set forth in claim 1 including automatically operable means for stopping said operating means when said arm has completed a page turning cycle, and means for initially starting said operating means.

6. A page turning device comprising a housing, means supporting said housing over a bed, a book rack carried by said housing, a plurality of flexible page turning members, means holding the lower ends of said members below said rack and in the transverse median thereof, a magazine carried by said housing, means carried by the upper ends of said flexible members engageable with said magazine for holding said flexible members at an angle to the vertical at one side of said transverse median, an oscillatable arm, operating means for said arm, and means carried by said arm engageable with the means on the upper ends of said flexible members for gripping said flexible members in succession and swinging the latter to the other side of said transverse median.

7. A page turning device as set forth in claim 6 wherein said operating means includes an electric motor, and circuit making and breaking means connected to said motor and disposed in a position at the end of the page turning cycle of said arm for breaking the circuit to said motor.

8. A page turning device as set forth in claim 6 wherein said operating means includes an electric motor, a normally closed switch carried by said housing, and means disposed in the path of the swinging of said arm for moving said switch to open position when said arm reaches the end of its page turning cycle.

9. A page turning device as set forth in claim 6 wherein said operating means includes an electric motor, a normally closed switch connected to said motor, means carried by said housing in the path of the swinging of said arm for moving said switch to open position when said arm reaches substantially the end of its page turning cycle, and a normally open shunt switch connected to said motor for closing the circuit thereto and effecting initial operation thereof when said first switch is in open position.

10. A page turning device as set forth in claim 6 wherein said magazine includes yieldable holding means for the means at the upper ends of said flexible members, and means for releasing the foremost of said means at the upper ends of said flexible members when said arm is in substantially confronting position with respect to said magazine.

TELESPHORE C. DEMERS.